A. MARSH.
TICKET DELIVERING, CHECKING, AND REGISTERING MACHINE.
APPLICATION FILED MAY 27, 1919.
1,378,419. Patented May 17, 1921.
6 SHEETS—SHEET 3.
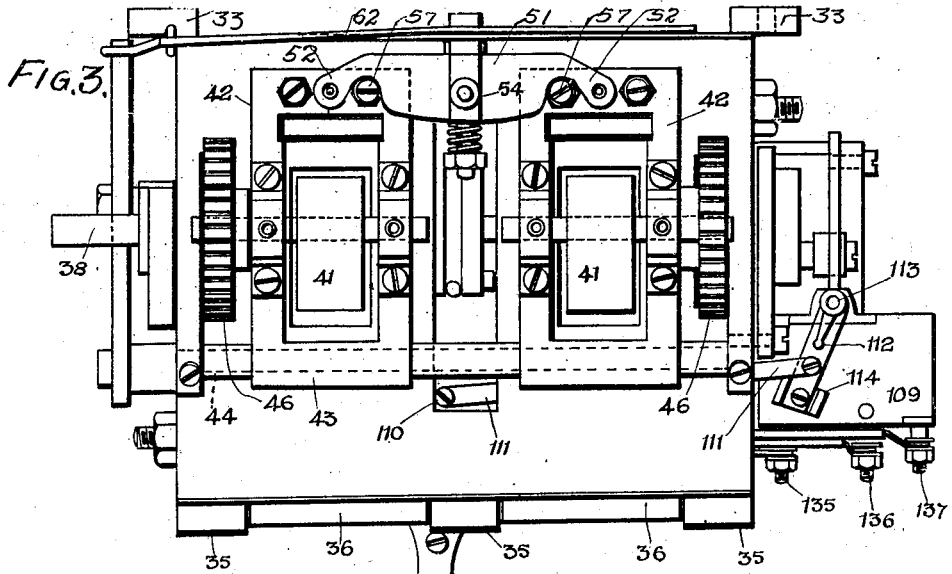
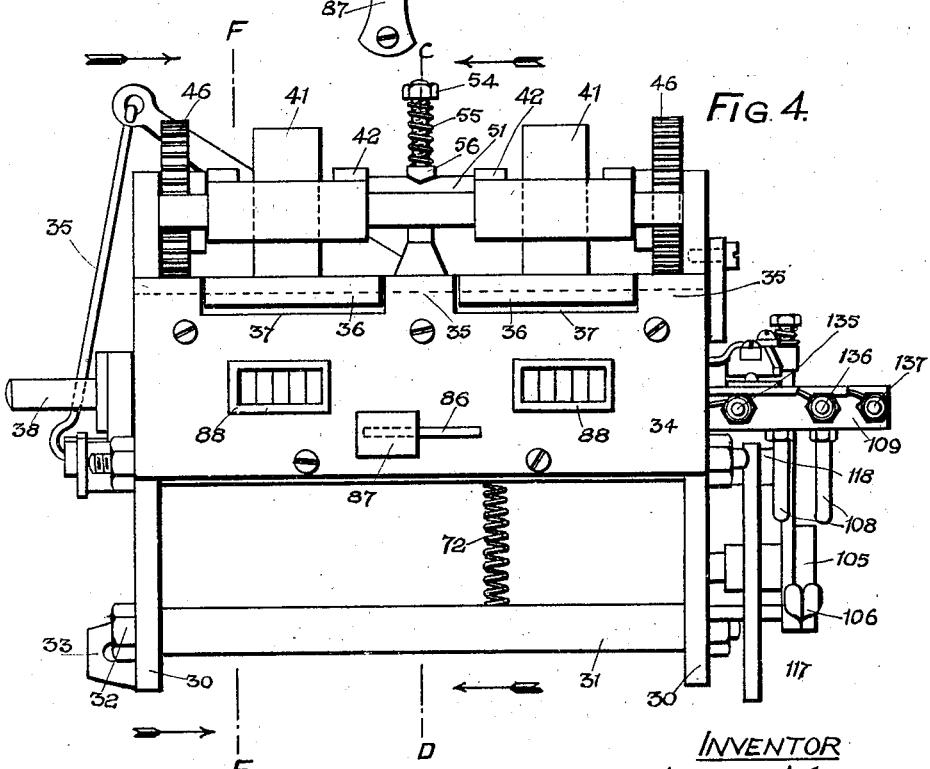
INVENTOR
ALBERT MARSH
PER:— Rayner & Co
ATTORNEYS A. MARSH.
TICKET DELIVERING, CHECKING, AND REGISTERING MACHINE.
APPLICATION FILED MAY 27, 1919.

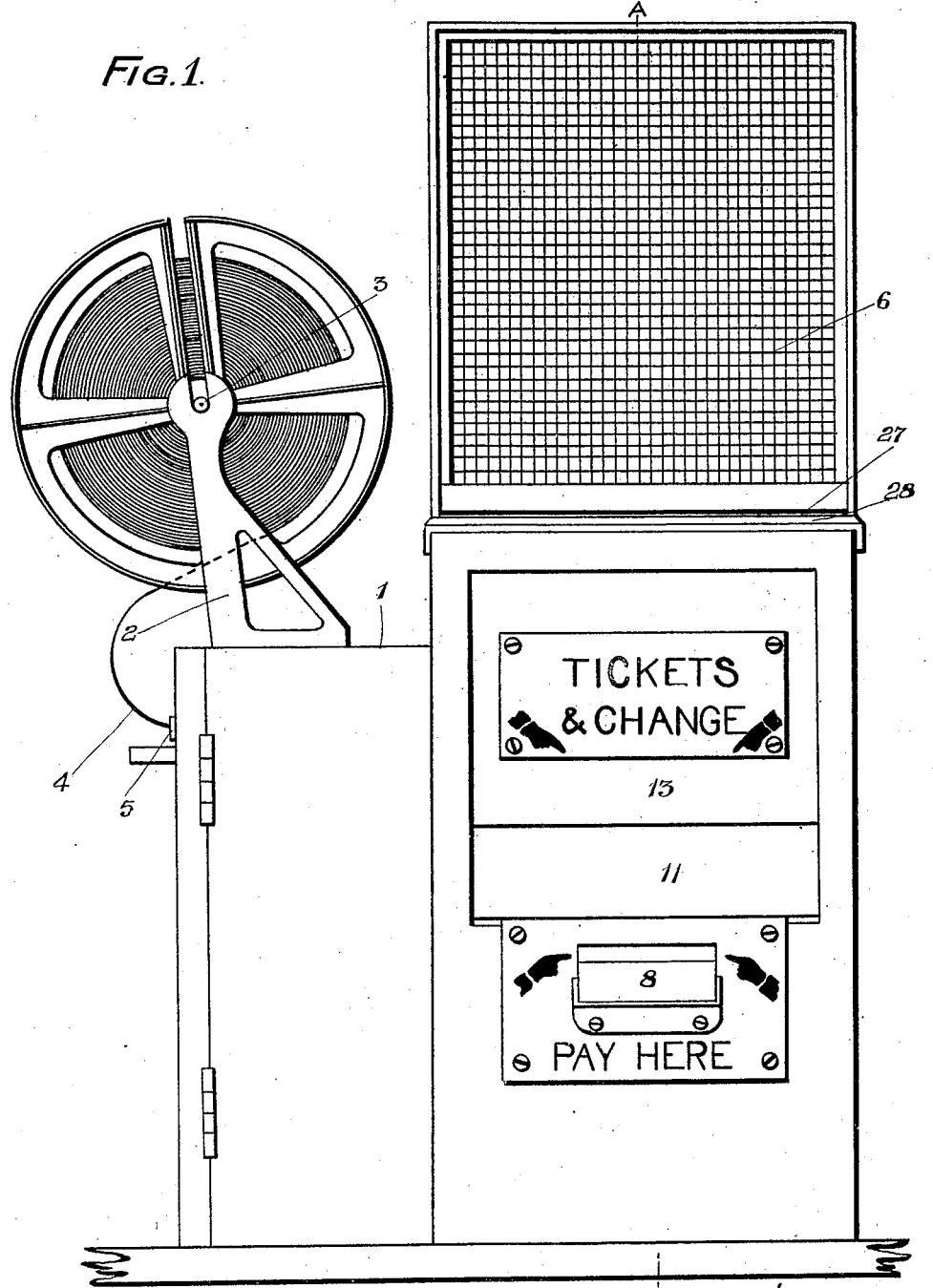

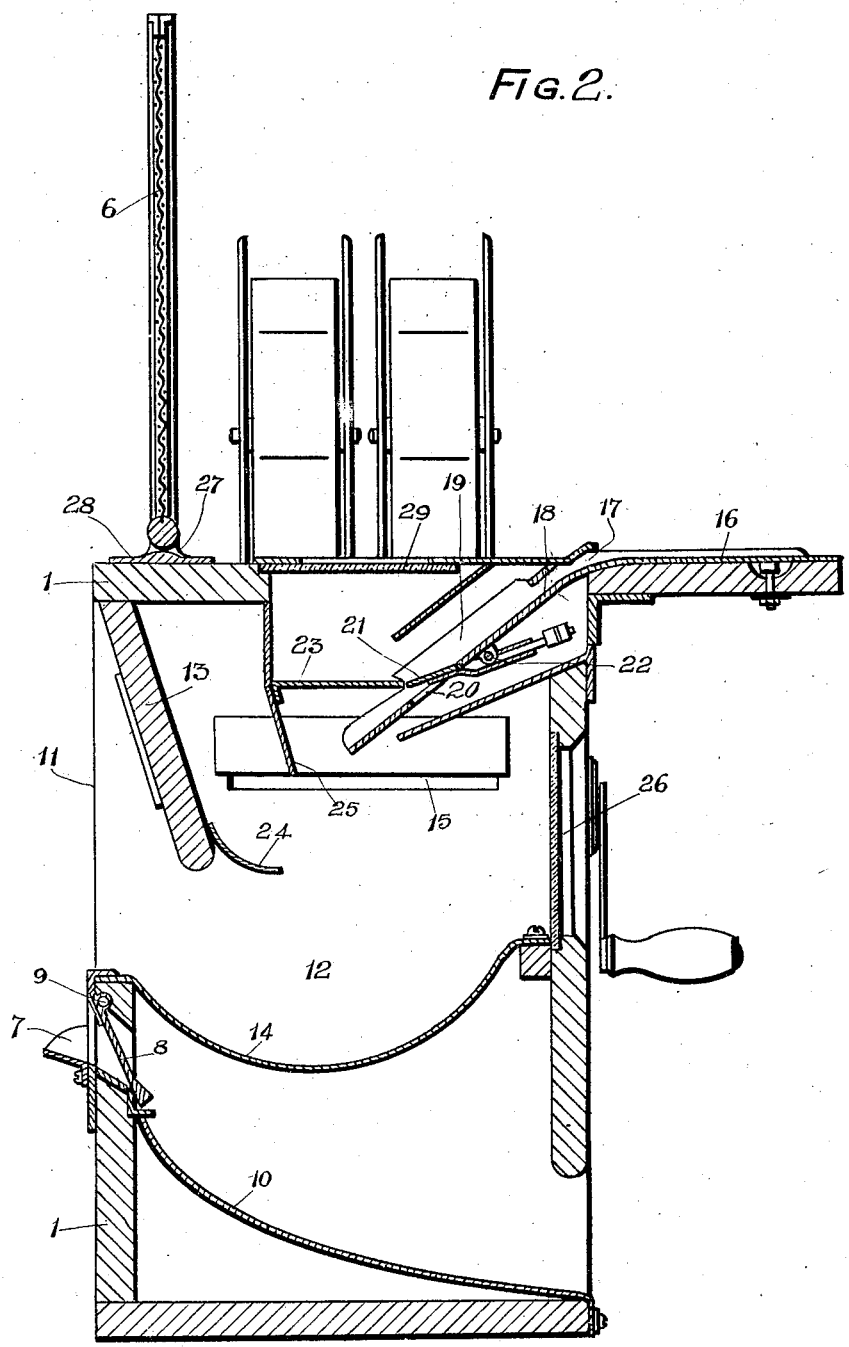

1,378,419.

Patented May 17, 1921.
6 SHEETS—SHEET 4.

INVENTOR
ALBERT MARSH
PER:- Rayner &/o
ATTORNEYS.

A. MARSH.
TICKET DELIVERING, CHECKING, AND REGISTERING MACHINE.
APPLICATION FILED MAY 27, 1919.

1,378,419.

Patented May 17, 1921.

INVENTOR
ALBERT MARSH
PER:- Rayner & Co.
ATTORNEYS

A. MARSH.
TICKET DELIVERING, CHECKING, AND REGISTERING MACHINE.
APPLICATION FILED MAY 27, 1919.

1,378,419.

Patented May 17, 1921.
6 SHEETS—SHEET 6.

INVENTOR
ALBERT MARSH
PER:—
Rayner & Co
ATTORNEYS

UNITED STATES PATENT OFFICE.

ALBERT MARSH, OF CHERTSEY, ENGLAND.

TICKET DELIVERING, CHECKING, AND REGISTERING MACHINE.

1,378,419.     Specification of Letters Patent.     Patented May 17, 1921.

Application filed May 27, 1919. Serial No. 300,160.

*To all whom it may concern:*

Be it known that I, ALBERT MARSH, subject of the King of Great Britain and Ireland, residing at "The Bungalow," Chertsey Bridge, Chertsey, in the county of Surrey, England, have invented certain new and useful Improvements in or Relating to Ticket Delivering, Checking, and Registering Machines, of which the following is a specification.

My invention relates to improvements in ticket delivering, checking, and registering machines for use in theaters, picture houses, exhibitions and similar places in which money is paid for admission or for the purchase of articles or commodities, and has reference to that type of machine in question wherein tickets are automatically fed forward, cut off and delivered combined with mechanism for checking and registering the number of tickets issued.

The objects of the present invention are to provide an apparatus wherein two tickets of different values or classes are fed forward, cut off from the strip and delivered separately and independently by the rotation of a single crank shaft, the checking and recording of each class of ticket issued being effected by mechanical or electrical means or both, such means being operated by each rotation of the crank shaft. A further object consists in an improved means for feeding forward the ticket strip and securing same against movement during the cutting operation. A further important feature of the invention consists of a clutch mechanism adapted to release the mechanism for feeding forward and cutting off one class of ticket and simultaneously locking the mechanism of the other class of ticket against movement, said clutch also serving to prevent the checking and registering mechanism of one class of ticket being operated during the time the other mechanism is in operation.

A further object of the invention consists in the provision in combination with the ticket issuing and registering mechanism of a box like structure or casing having suitable apertures on one side for the reception of money and for the delivery of the ticket and any necessary change, while the opposite side is provided with suitable means for receiving payments in coin and paper money and passing out change therefrom.

Another important feature of the invention consists in so arranging the apparatus that the possibility of fraud or fradulent dealing in the issuing of tickets is prevented, owing to the fact that the passage of a ticket through the apparatus is registered by a mechanically operated counting and registering device or an electrically operated registering device which may be located some distance away from the issuing apparatus, in a manager's or secretary's office for instance, or both the mechanically and the electrically operated registering mechanism may be operatively connected to the machine if necessary.

Further important features of the invention will be referred to hereinafter, and in order that the invention may be readily understood, reference is made to the accompanying drawings which show by way of example one form of the apparatus constructed according to the invention, in which:—

Figure 1 is a front elevation and

Fig. 2 is a transverse section on the line A—B of Fig. 1, showing the box like structure or casing having suitable means for receiving and delivering money and change.

Fig. 3 is a plan of the ticket delivering and registering mechanism.

Fig. 4 is a front view of Fig. 3.

Similar reference numerals are used to denote similar parts in all the figures.

Figure 5:
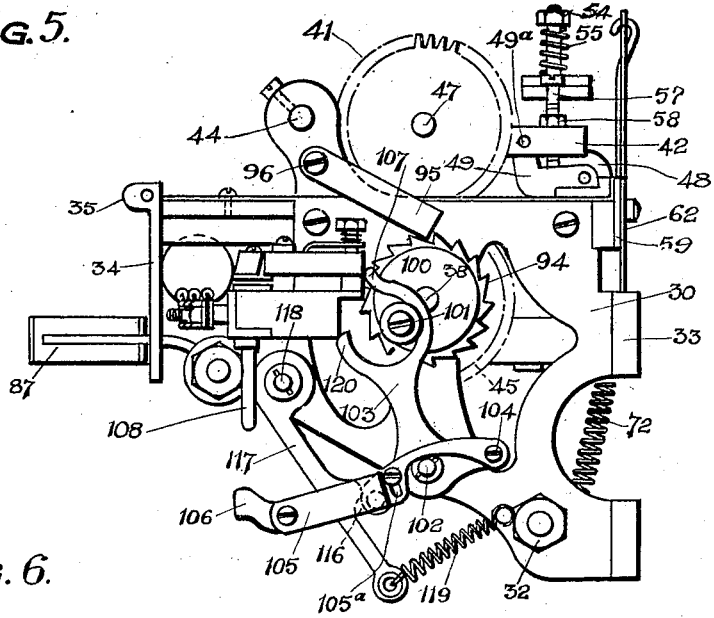
Fig. 5 is an end view seen from the right of Fig. 4.

Referring to Figs. 1 and 2, the apparatus comprises a box like structure or casing 1, on the top of which and on one side are mounted brackets 2 (only one of which is shown in Fig. 1) for revolubly supporting the spools 3 carrying the rolls of tickets in the form of a continuous strip 4, the tickets being printed or marked in any suitable manner.

The free ends of the reels are fed into the casing 1 through a slot 5 in the side of the casing, within which the ticket delivering and registering apparatus illustrated in Figs. 3 to 9 is located. The box like structure may be mounted within a suitable box office or pay desk and is provided with a screen 6 preferably of small wire mesh attached to its top. The lower front portion of the casing is provided with an aperture 7 within which the money is placed, suitable directions being marked on a plate surrounding or fixed adjacent to, the wall of the casing in any suitable manner, as illustrated in Fig. 1. The aperture is normally closed by a weighted shutter or flap 8 pivoted at 9 to the casing and so shaped on its inner side as to render it impossible to open the flap from the inside. The rear of the aperture is provided with a partition 10 which constitutes a curved surface down which the inserted paper money, coin or coins fall to the rear of the apparatus. The upper front portion of the casing is provided with an aperture 11 leading to a chamber 12 adapted to receive the ticket from the ticket delivering mechanism and any change required from the amount tendered. This aperture is provided with an inwardly sloping wall 13 to enable the receiver to remove by hand the ticket and any change delivered into the chamber 12. The ticket is delivered into the chamber 12 through the opening 15 in the side of the casing.

A flat table 16 is provided at the back of the apparatus near the top of the casing and at the front edge of this table are openings 17. Extending inwardly from these openings is a downwardly sloping plate 18, divided or separated by walls or partitions 19, down which plate the coin or coins are slid and whence they fall onto the plate 14 constituting the base of the chamber 12. In order to prevent the passage of a ticket in this manner the plate 18 has a series of recesses or apertures 20 within which move weighted flaps 21 pivoted at 22 to the underside of the plate 18. These flaps normally project upwardly and are so weighted that unless the article sliding down the plate 18 is heavy enough to depress the flap during its passage, the said article will be delivered on to the platform 23, or be blocked in its downward passage by the baffle plate 25. When the coin or coins fall from the end of the plate 18, they are guided downwardly on to the curved base of the chamber 12 by the baffles or guide plates 24, 25. The rear of the chamber 12 is provided with a glazed window or aperture 26 through which the cashier may if necessary examine the change delivered into the chamber 12.

At the lower end of the wire screen a narrow aperture 27 is provided having flared entrances from either side permitting the passage of a bank or treasury note between the top of the aperture and the curved base 28, but not a ticket which is of thicker substance than the note. The aperture may if desired be provided with two rollers between which the bank note may be passed by rotating one or both rollers by any suitable means. The top of the casing is also provided with a glazed window or aperture 29 showing a closed chamber into which any lighter article than a coin will pass and will at once be detected.

Referring now to Figs. 3 to 10, which show the mechanism for delivering and registering the tickets, the apparatus comprises a frame built up of side members 30 secured the desired distance apart by distance pieces 31 through which pass suitable bolts 32, the side members 30 being provided with lugs 33 serving to attach the mechanism onto the interior of the casing 1. The front edges of the side members 30 are connected by a plate 34 having lugs 35 between which are mounted guide rollers 36 for guiding the two ticket strips onto the bed $36^a$ of the machine, said strips being fed side by side through the apertures 37 between the edges of the plate 34 and the rollers 36.

Mounted in suitable bearings between the side members 30 is a crank shaft 38 on which are rotatably mounted sleeves 39 see Fig. 6 to which are fixed rollers 40 (hereinafter referred to as the lower feed rollers) coöperating with similar rollers 41 (hereinafter referred to as the upper feed rollers) mounting in oscillating arms or cradles 42 pivoted at 43 to the spindle 44 mounted between the side members 30. Each of the sleeves 39 carries at one end, preferably the outer ends, pinion wheels 45 adapted to mesh with corresponding pinion wheels 46 on one end of each of the spindles 47 to which the upper rollers 41 are secured. Each of the upper and lower feed rollers 41 and 40 have a portion of their periphery cut away leaving the circumferential length of the remaining portion approximately equal to the length of the ticket to be issued, the pinion wheels 45 on the ends of the sleeves 39, and the pinions 46 of the spindles 47 carrying the rollers 41, being so geared that the ticket strip is only fed forward when engaged on both sides by the outer periphery of both of the feed rollers 40 and 41.

In order to prevent movement of the ticket strip during the cutting off operation, and after it has been fed forward to the required extent, each of the oscillating arms or cradles 42 carrying the upper rollers 41, is provided at or near its free end, with an adjustable tension roller 48 rotatably mounted in suitable bearings formed in the arms 49 of the cradle. The upper feed rollers 41 are maintained in operative position with relation to the lower feed rollers, by a spring pressed plate 51 having laterally extending arms 52, the ends of which are adapted to engage the ends of the pins 50 projecting upwardly from the cradle 42 (see Figs. 3 and 8). This plate 51 is freely mounted centrally on a projecting pin 53 secured to the frame member 53ª, said pin being screwed at its upper end to receive a nut 54, a spring 55 being interposed between the nut 54 and a collar 56 on the top of the plate 51, to normally press this plate downwardly, its outer arms 52 engaging the pins 50 secured to the cradle, thus forcing the upper feed rollers 41 and the tension rollers 48 into engagement with the ticket strip. In order to enable the length of the ticket to be regulated or adjusted, the cradles 42 are provided with set screws 57 and lock nuts 58 for enabling the upper feed rollers to be elevated when desired relatively to the lower feed rollers.

The ticket strips are only fed during the time that they are gripped between the peripheries of the feed rollers and the length of peripheral contact between the rollers can be adjusted by raising the upper roller of a pair and turning it relative to the lower roller. In this way any proportion of the periphery of the feed rollers may be made effective for driving purposes, so that the length of the strip fed and severed at each operation can be varied as desired.

Mounted to the rear of the frame of the machine, and adjacent to the tension rollers, is a plate 59 secured to the side members 30 by the screws 60. This plate is provided with two slots corresponding with the width of the tickets or it may have a single slot 61 extending to within a short distance of each end.

The mechanism for cutting off each ticket, as soon as the ticket strip has been fed forward the required distance, comprises a double edged guillotine-like knife 62, having two cutting edges 62ª and 62ᵇ, rotatably mounted at or about its center on a pin 63. This pin which passes through a hole in the frame member 53ª, is screwed at its opposite end to receive a nut 64 and a spring 65 is interposed between the said nut 64 and the frame member 53ª tending to force the knife 62 into contact with the slotted plate 59, so as to cause the knife to make a clean cut through the ticket strip projecting from one of the slots or from one of the ends of the slot 61. At or near one end of the crank shaft 38, is fixedly mounted a cam 66 (see Fig. 9) adapted to engage a roller 67 mounted on a projecting pivot on a rocking lever 68 pivoted to one of the side members 30 at 69. The opposite end of this rocking lever carries a connecting rod or bar 70 secured to one end of the knife 62 at 71, the knife being maintained in its normal position by a spring 72 secured to the hollow rod or sleeve 31 and to the opposite end of the knife 62. When the crank shaft 38 is rotated (the direction of rotation being anti-clockwise in Fig. 9), the surface 73 of the cam 66 engages the roller 67 and moves the lower end of the lever 68 to the right. This movement causes the connecting rod 70 to be moved downward and the knife to be moved to the position shown in dotted lines in Fig. 8, severing the ticket from the strip. As soon as the roller 67 reaches the top 74 of the cam 66, it is returned to its normal position by the spring 72.

Figure 6:
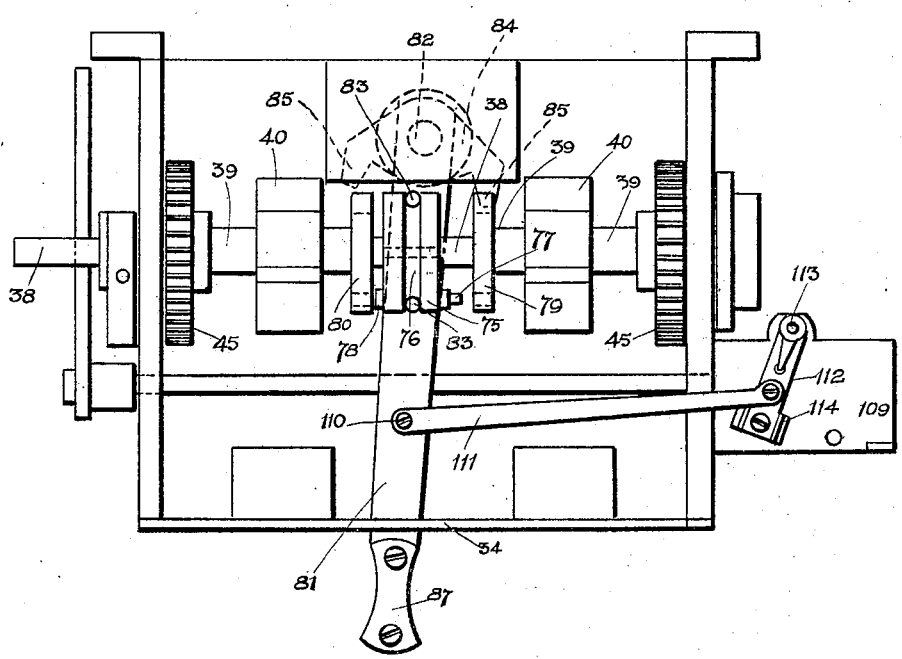
Fig. 6 is a view similar to Fig. 3 but with the upper feed rollers for both sets of issuing mechanism removed.
Figure 7:
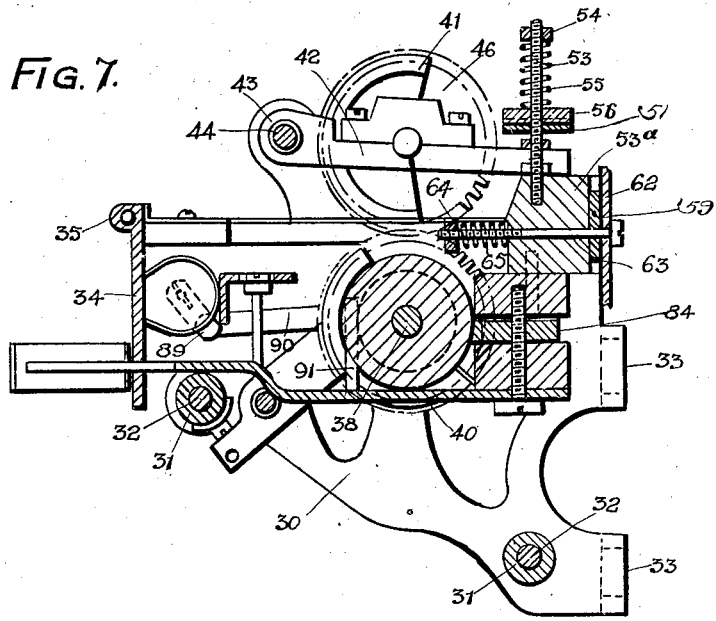
Fig. 7 is a transverse section on the line C—D, Fig. 4 taken in the direction of the arrows.
Figure 8:
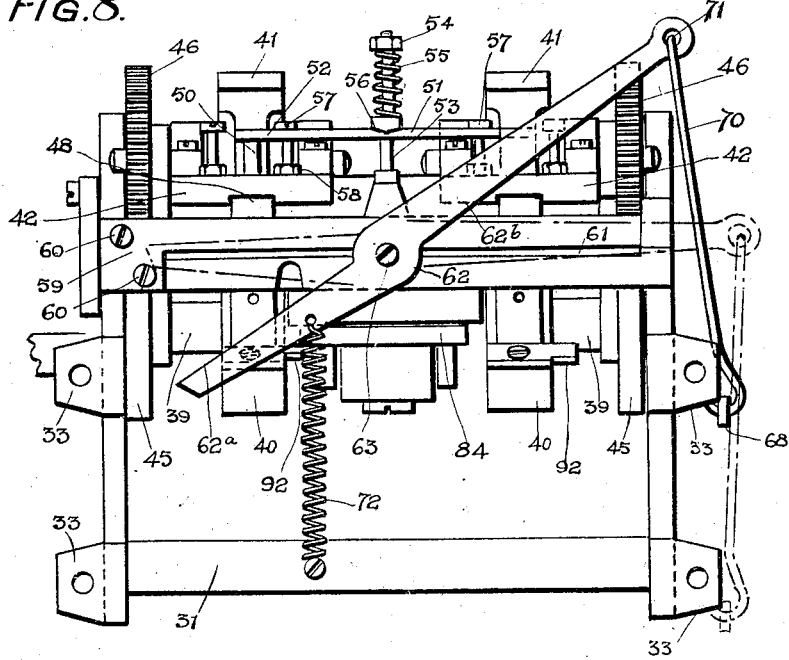
Fig. 8 is a rear elevation.
Figure 9:
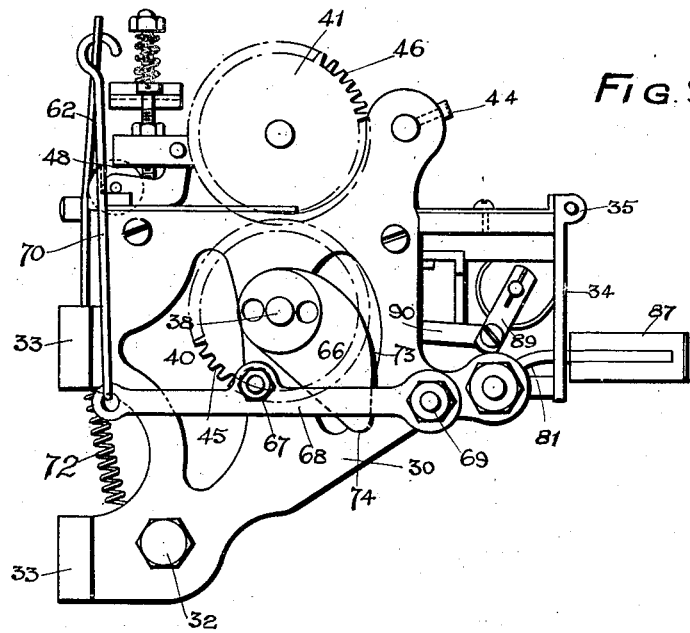
Fig. 9 is an end view seen from the left of Fig. 4.
Figure 10:
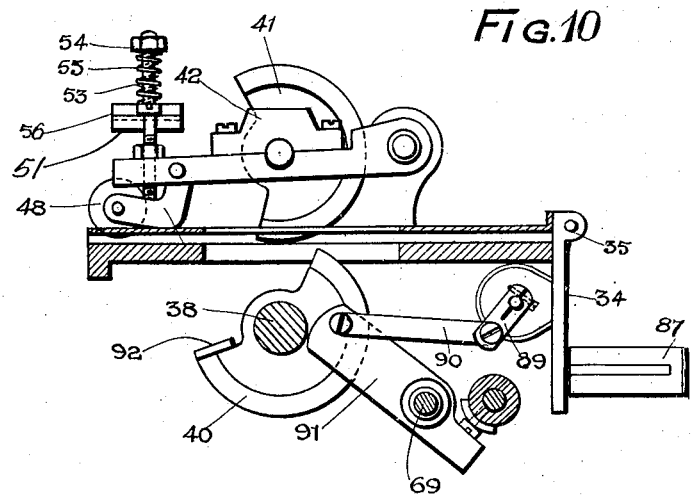
Fig. 10 is a fragmental section on the line F—F, Fig. 4, taken in the direction of arrow.

In order to prevent the mechanism of one class of ticket operating while the mechanism of the other set is being operated, a clutch device see Fig. 6, preferably arranged between the two rollers 40, or between the inner ends of the sleeves 39, is provided, by means of which the mechanism not in operation is locked against movement. The clutch device comprises a collar 75 slidably keyed to the crank shaft 38 and secured against rotation thereon. This collar is provided with a centrally disposed annular groove 76 and pins 77 and 78 projecting outwardly on either side. To the inner ends of the sleeves 39, rotatably mounted on the crank shaft 38, are secured disks 79 and 80 each having a perforation or slot registering with the pins 77 or 78 so that when the collar 75 is moved to either of its extreme positions, one of the sleeves 39 will be locked to, and caused to rotate with, the crank shaft 38. The movement of the collar 75 is effected by a rocking lever 81, pivoted at 82 to the rear part of the machine frame, and provided with upwardly projecting pins 83 engaging the annular groove 76 in the collar 75. To the lower end of the rocking lever 81 is secured a locking plate 84 having two laterally projecting arms 85 adapted to engage corresponding radial slots in the periphery of the disks 79 and 80 (Figs. 6 and 7). By this means, when the collar 75 is moved to the left as shown in Fig. 6, so as to lock the sleeve carrying the disk 80 to the crank shaft 38, the disk 79 secured to the other sleeve will be locked against movement by the locking plate as shown in the drawings. It will be understood that if the collar 75 is moved to its opposite extreme position, to the right in Fig. 6, the pin 78 will be released from the recess or slot in the disk 80, while the pin 77 will enter the corresponding hole or slot in the disk 79 so that the latter will now be locked and rotate with the crank shaft 38, the locking plate 84 being simultaneously moved to engage the disk 80 and prevent its movement.

The lever 81 is extended toward the front of the mechanism and passes through a slot 86 in the plate 34, the length of this slot being sufficient to allow the collar 75 to be moved to either of its extreme positions. The outer projecting end of the lever 81 is provided with a handle 87 shaped to facilitate its operation.

One end of the crank shaft 38 is provided with a suitable operating handle which may be moved into engagement therewith through a hole previously formed in the rear of the casing 1.

The mechanically operated mechanisms for checking and registering the number of tickets issued of each class, are located side by side beneath the front plate 34, the latter being provided with apertures or windows 88 through which the indicators may be viewed. The counting mechanism for each class of ticket is rotated through the distance representing one unit by the arm 99 to the free end of which is secured one end of a rod or connecting lever 90, the opposite end being attached to the arm 91 pivotally mounted on the machine frame. This arm is operated by the finger piece 92 secured to, and projecting from, one end of the cutaway periphery of the feed or lower rollers 40. When the finger piece 92 comes into contact with the arm 91, the latter together with the lever 90 is moved forwardly toward the front of the machine, so as to cause the counting mechanism to advance the figures by one unit, the levers being returned to their normal position by a spring. As the finger piece 92 for operating or registering the mechanism of each class of ticket is carried by the feed rollers 40, it will be understood that only the registering mechanism for the ticket previously fed forward and cut off will be operated, as the feed roller 40 for the other class of ticket is locked against movement as previously described.

In order to prevent the rotation of the crank shaft 38 in the wrong direction, the end of the shaft carries a ratchet wheel 94 which is engaged by a spring controlled pawl 95 pivotally mounted at 96 to the side member 30.

The electrically operated mechanism for checking and registering the tickets issued will now be described.

To the end of the crank shaft 38, adjacent to the ratchet wheel 94 is secured a disk or collar 100 having concentrically mounted thereon a roller 101 projecting outwardly therefrom. To the adjacent side member 30 is pivotally mounted at 102 a bifurcated lever 103, the prongs or arms of which normally embrace the roller 101 on the disk 100. The lower end of the lever 103 carries an extension to which is pivoted at 104 a loose arm 105 carrying at its free end suitable resilient contact brushes 106, which, when said arm is rotated by the roller 101, engaging the elongated prong 107 of the lever 103, are moved into engagement with contact pins 108 mounted in an insulated manner and so as to project downwardly from a bracket 109 (Fig. 4).

The clutch operating lever 81 is pivotally connected at 110 to a laterally extending arm 111 connected at its opposite end to an insulated lever 112 rotatably mounted on a pin 113 secured at the rear of the bracket 109. The insulated lever 112 carries at its end an insulated bearing piece or bridge 114 adapted to connect or bridge two of the studs mounted on the upper face of the bracket 109, that is, the bridge 114 is adapted to connect the central stud with either of the two outer studs when moved to either of its two extreme positions. In order to enable the contact brushes 106 to be moved into and out of contact with the pins 108 quickly the lever 103 carries a roller on its inner face adapted to be engaged by a projecting cam surface 116 on the lever 117, pivoted at 118 to the side member 30, the cam 116 being normally maintained in contact with the roller on the lever 103 by a spring 119. The object of this cam is to cause the brushes 106 to receive a sudden "kick" at the moment they approach or commence to leave the contact pins 108, the lever 105 having an elongated slot 105ª by means of which its movement independent of the bifurcated lever 103 is limited.

The operation of this part of the apparatus is as follows:—

In the position shown in Fig. 5 the contact brushes 106 are at their lowest position out of contact with the pins 108. If now the crank shaft 38 is rotated, the direction of rotation being clockwise in Fig. 5, the roller 101 will engage the elongated prong 107 and rotate the top of the bifurcated lever 103 to the right about its pivot 102. This movement of the lever 103 carries with it the lever 105 so that the contact brushes 106 approach the contact pins 108. At the same time the roller on the inner side of the lever 103 engages the lower face of the cam 116 causing the lever 117 to rotate about its pivot 118 against the action of the spring 119. When the roller reaches the point of the cam, the contact brushes 106 have almost reached the pins 108. As the point of the cam 116 which is pressing on the roller owing to the spring 119 passes over the pivotal center of the roller, the top of the lever 105 is given a sudden kick to cause it to move upwardly independently of the bifurcated lever 103 causing the contact brushes to move quickly into engagement with the contact pins 108. On further rotation of the crank shaft 38, the roller 101 eccentrically mounted on the disk 100 will engage the short arm 120 of the lever 103 and move the latter in an anti-clockwise direction. This causes the roller mounted on the side of the lever 103 to engage the upper face of the cam 116, and when it reaches the highest point of the cam, the lever 105 is given a kick in the opposite direction, to carry the contact brushes 106 clear of the contact pins 108 thus rendering double contact impossible.

In operation, assuming that the spools 3 are provided each with a ticket strip 4 and that the two strips are threaded over the bed 36$^a$ and beneath the rollers 48, the lever 87 is first moved into the appropriate position in accordance with the value of the ticket it is required to deliver. When the lever 87 has been so operated, the operating handle on the shaft 38 is given one rotation thus causing one pair of feed rollers to be driven to feed one of the ticket strips for the length of a ticket. As already explained, the rotation of the shaft 38 also operates the severing knife 62 after the ticket strip has been fed so that the required length is cut off and drops into the receptacle 14. If the position of the lever 87 is now altered, and the shaft 38 again rotated, the other strip 4 is fed and a length severed.

It will be appreciated that many modifications may be made in the precise construction of the details of the invention. Thus for example, a modified form of money receiving means comprises a chute in which the money is placed and which is so formed and provided with suitable constructions, as to prevent the passage of tickets or the like from within but freely permit the passage of the money from the purchaser to the cashier.

In a further modification the chute through which change is passed instead of having the weighted platform referred to above may have apertures of a suitable size and shape to allow the change to fall through but which would cause a ticket or the like to pass into a closed receptacle provided above the delivery aperture.

What I claim as my invention and desire to obtain by Letters Patent is:—

1. In a ticket delivering machine, the combination of means for supporting two separate ticket strips, a driving shaft, a pair of feed rollers loosely mounted side by side on said shaft, a clutch device slidably keyed to said shaft, a lever associated with said clutch device, locking means secured to said lever, said lever being adapted to be operated to move said clutch in either direction for driving engagement with either feed roller and simultaneously to move the locking means into engagement with the feed roller which is not being driven so as to secure the same against rotation, a second pair of feed rollers geared to and coöperating with the first pair of feed rollers to feed the ticket strips forward therebetween, means for adjusting the pairs of feed rollers with respect to one another, and registering means for registering the tickets delivered from each strip.

2. In a ticket delivering machine, the combination of means for supporting two separate ticket strips, a driving shaft, a pair of feed rollers loosely mounted side by side on said shaft, a second pair of feed rollers mounted in spring pressed adjustable pivotal cradles, a clutch device slidably keyed to said driving shaft, a lever associated with said clutch device, a locking plate secured to said lever, said lever being adapted to slide the clutch in either direction for driving engagement with either of the first pair of feed rollers and simultaneously to move the locking plate into engagement with the other of said first pair of feed rollers so as to lock the same against rotation, means for registering the tickets delivered and gearing between the feed rollers of the first pair and the feed rollers of the second pair adapted to cause rotation of the same in opposite directions to feed the ticket strips forward.

3. In a ticket delivering machine, the combination of means for supporting two separate ticket strips, a driving shaft, a pair of feed rollers loosely mounted side by side on said shaft, a driving gear wheel associated with each of said rollers, a second pair of feed rollers mounted in spring pressed adjustable pivotal cradles, a gear wheel associated with each of said second pair of feed rollers and meshing with the driving gear wheels of the first pair of feed rollers, a clutch device slidably keyed to said driving shaft, a lever associated with said clutch device, a locking plate secured to said lever, said lever being adapted to slide the clutch in either direction for driving engagement with either of the first pair of feed rollers and simultaneously to move the locking plate into engagement with the other of said first pair of feed rollers so as to lock the same against rotation, the peripheries of the first pair of feed rollers coöperating with the peripheries of the second pair of feed rollers to feed either of the ticket strips forward therebetween, and means for registering the ticket delivered.

4. In a ticket delivering machine, the combination of means for supporting two separate ticket strips, a driving shaft, a pair of feed rollers loosely mounted on said driving shaft and having a portion of their peripheries cut away, a second pair of feed rollers mounted on spring pressed adjustable pivotal cradles, a driving gear wheel associated with each of the first pair of feed rollers, a gear wheel associated with each of the second pair of feed rollers and engaging the gear wheel of the first pair of feed rollers, a clutch device slidably keyed to said driving shaft, a lever associated with said clutch device, a locking plate secured to said lever, said lever being adapted to slide the clutch in either direction for driving engagement with either of the first pair of feed rollers and simultaneously to move the locking plate into engagement with the other of said first pair of feed rollers so as to lock the same against rotation, means for registering the tickets delivered and means for rotating said driving shaft to cause the feed roller in driving engagement therewith and the feed roller of the other pair geared thereto to rotate in opposite directions to feed the ticket strip forward therebetween.

5. In a ticket delivering machine the combination of means for supporting two separate ticket strips, a driving shaft, a pair of feed rollers loosely mounted side by side on said shaft, a clutch device slidably keyed to said shaft, a lever associated with said clutch device, a locking plate secured to said lever, said lever being adapted to slide the clutch in either direction for driving engagement with either feed roller and simultaneously to move the locking plate into engagement with the feed roller which is not being driven so as to lock same against rotation, and a second pair of feed rollers each carried in a spring pressed adjustable pivoted cradle and each geared to one of the feed rollers of the first pair and adapted to coöperate one with each of the first pair of rollers, means for registering he tickets delivered, and a tension roller adjustably carried by the free end of each cradle.

6. In a ticket delivering machine the combination of means for supporting two separate ticket strips, a driving shaft, a pair of feed rollers loosely mounted side by side on said shaft, a driving gear wheel associated with each of said rollers, a clutch device slidably keyed to said shaft, a lever associated with said clutch device, a locking plate secured to said lever, said lever being adapted to slide the clutch in either direction for driving engagement with either feed roller and simultaneously to move the locking plate into engagement with the feed roller which is not being driven so as to lock same against rotation, and a second pair of feed rollers each carried in a spring pressed adjustable pivoted cradle and adapted to coöperate one with each of the first pair of rollers and a tension roller adjustably carried by the free end of each cradle, means for registering the tickets delivered and a driven gear wheel associated with each of said second pair of gear wheels and each gearing with one of said driving gear wheels.

7. In a ticket delivering machine the combination of means for supporting two separate ticket strips, a driving shaft, a pair of feed rollers, each having a portion of its periphery cut away and loosely mounted side by side on said shaft, a driving gear wheel associated with each of said rollers, a clutch device slidably keyed to said shaft, a lever associated with said clutch device, a locking plate secured to said lever, said lever being adapted to slide the clutch in either direction for driving engagement with either feed roller and simultaneously to move the locking plate into engagement with the feed roller which is not being driven so as to lock same against rotation, means operated by the rotation of said driving shaft for registering the tickets delivered and a second pair of feed rollers each having a portion of its periphery cut away and each carried in a spring pressed adjustable pivoted cradle and adapted to coöperate with each of the first pair of rollers, and a tension roller adjustably carried by the free end of each cradle, and a driven gear wheel associated with each of said second pair of gear wheels and each gearing with one of said driving gear wheels.

8. In a ticket delivering machine the combination of means for supporting two separate ticket strips, a driving shaft, a pair of feed rollers loosely mounted side by side on said shaft, a clutch device slidably keyed to said shaft, a lever associated with said clutch device, a locking plate secured to said lever, said lever being adapted to slide the clutch in either direction for driving engagement with either feed roller and simultaneously to move the locking plate into engagement with the feed roller which is not being driven so as to lock the same against rotation, and a second pair of feed rollers each carried in a spring pressed pivoted cradle and adapted to coöperate one with each of the first pair of rollers, means for registering the tickets delivered and a cam on said driving spindle for operating a centrally pivoted cutting-off knife.

9. A ticket delivering machine, comprising in combination, a casing, means for supporting two separate ticket strips, a driving shaft, a pair of feeding rollers loosely mounted on said driving shaft, a gear wheel associated with each of said rollers, a clutch device slidably keyed to said driving shaft, a lever associated with said clutch device, a locking plate secured to said lever, said lever being adapted to slide the clutch in either direction for driving engagement with either of said feed rollers and simultaneously to move the locking plate into engagement with the feed roller which is not being driven so as to lock the same against rotation, a second pair of feed rollers each mounted in a cradle pivoted about an axis parallel to said driving shaft, a spring pressed plate adapted to press said second pair of feed rollers toward the first pair of feed rollers, means for adjusting the feed, means for registering the tickets delivered, and gearing between each roller of the first pair of feed rollers and the rollers of the second pair to cause the ticket to be fed forward therebetween.

10. A ticket delivering machine, comprising in combination, a casing, means for supporting two separate ticket strips, a driving shaft, a pair of feed rollers loosely mounted on said driving shaft and each having a portion of their peripheries cut away, a gear wheel associated with each of said feed rollers, a clutch device slidably keyed to said shaft between said feed rollers, a lever associated with said clutch device, a locking plate secured to said lever, said lever being adapted to slide the clutch in either direction for driving engagement with either feed roller and simultaneously to move the locking plate into engagement with the feed roller which is not being driven so as to lock the same against rotation, a second pair of feed rollers mounted in a cradle and having a portion of their peripheries cut away, a gear wheel associated with each of said second pair of feed rollers engaging the gear wheel of one of the feed rollers of the first pair, the outer peripheries of the first pair of feed rollers coöperating with the outer peripheries of the second pair of feed rollers to feed the ticket strips forward therebetween, means operated by the feed rollers of the first pair for registering the tickets delivered, and a tension roller on each of said cradles adapted to engage the ticket strips and to secure the same against movement when the respective strips have been fed forward to the required extent.

11. A ticket delivering machine, comprising in combination, a casing, means for supporting two separate ticket strips, a pair of feed rollers loosely mounted on said driving shaft and each having a portion of their peripheries cut away, a gear wheel associated with each of said feed rollers, a clutch device slidably keyed to said shaft between said feed rollers, a lever associated with said clutch device, a locking plate secured to said lever, said lever being adapted to slide the clutch in either direction for driving engagement with either feed roller and simultaneously to move the locking plate into engagement with the feed roller which is not being driven so as to lock the same against rotation, a second pair of feed rollers each mounted in a cradle and having a portion of their peripheries cut away, a gear wheel associated with each of said second pair of feed rollers engaging the gear wheel of one of the feed rollers of the first pair, the outer peripheries of the first pair of feed rollers coöperating with the outer peripheries of the second pair of feed rollers to feed the ticket strips forward therebetween, means operated by the feed rollers of the first pair for registering the tickets delivered, a cam on one end of said driving shaft adapted to operate a pivoted cutting off knife, a spring for effecting the return movement of said knife, and a tension roller on each of said cradles adapted to engage the respective ticket strips and to secure same against movement during the cutting off operation.

12. In a ticket delivering machine, the combination of a frame for supporting two separate ticket strips, a driving shaft, a pair of feed rollers loosely mounted side by side on said shaft, a clutch device slidably keyed to said shaft, a lever associated with said clutch device, locking means secured to said lever, said lever being adapted to be operated to move said clutch in either direction for driving engagement with either feed roller and simultaneously to move the locking means into engagement with the feed roller which is not being driven so as to secure the same against rotation, a second pair of feed rollers geared to and coöperating with the first pair of feed rollers to feed the ticket strips forward therebetween, a counting device including an operating lever associated with each of said ticket strips, and a projecting plate secured to each of the rollers of the first pair adapted when the latter rollers are rotated to operate the operating lever of the counting device associated therewith.

13. In a ticket delivering machine, the combination of a frame for supporting two separate ticket strips, a driving shaft, a pair of feed rollers loosely mounted side by side on said shaft, a clutch device slidably keyed to said shaft, a lever associated with said clutch device, locking means secured to said lever, said lever being adapted to be operated to move said clutch in either direction for driving engagement with either feed roller and simultaneously to move the locking means into engagement with the feed roller which is not being driven so as to secure the same against rotation, a second pair of feed rollers geared to and coöperating with the first pair of feed rollers to feed the ticket strips forward therebetween, a counting device including an operating lever associated with each of said ticket strips, a link connected at one end to said operating lever and at its opposite end to a second lever pivotally mounted in said frame, and a projecting plate secured to each of the feed rollers of the first pair, adapted when said rollers are rotated to engage one of said pivotal levers to operate the counting device associated therewith.

14. In a ticket delivering machine, the combination of a frame for supporting two separate ticket strips, a driving shaft, a pair of feed rollers loosely mounted side by side on said shaft, a clutch device slidably keyed to said shaft, a lever associated with said clutch device, locking means secured to said lever, said lever being adapted to be operated to move said clutch in either direction for driving engagement with either feed roller and simultaneously to move the locking means into engagement with the feed roller which is not being driven so as to secure the same against rotation, a second pair of feed rollers geared to and coöperating with the first pair of feed rollers to feed the ticket strips forward therebetween, a counting device including an operating lever mounted on said frame and associated with each of said ticket strips, a link pivotally connected at one end to said operating lever and at its opposite end to a second lever pivotally mounted in said frame, and a projecting plate secured to the inner end of each of the feed rollers of the first pair, adapted when said rollers are rotated through a complete revolution, to engage one of said pivotal levers and operate the counting device associated therewith through the distance representing one unit.

ALBERT MARSH.